(12) United States Patent
Yanase et al.

(10) Patent No.: US 8,115,134 B2
(45) Date of Patent: Feb. 14, 2012

(54) ARC EXTINGUISHING RESIN PROCESSED ARTICLE AND CIRCUIT BREAKER USING THE SAME

(75) Inventors: Hironori Yanase, Kawagoe (JP); Toshiyuki Kanno, Kawasaki (JP); Shuichi Sugiyama, Ichihara (JP)

(73) Assignee: Fuji Electric Fa Components & Systems Co., Ltd. (JP)

( * ) Notice: Subject to any disclaimer, the term of this patent is extended or adjusted under 35 U.S.C. 154(b) by 382 days.

(21) Appl. No.: 12/464,100

(22) Filed: May 11, 2009

(65) Prior Publication Data

US 2009/0283500 A1    Nov. 19, 2009

(30) Foreign Application Priority Data

May 16, 2008  (JP) ................. 2008-129232

(51) Int. Cl.
  *H01H 33/02* (2006.01)
(52) U.S. Cl. ......... 218/158; 218/150; 524/446; 524/570
(58) Field of Classification Search .................. 524/570, 524/446; 218/150, 158
  See application file for complete search history.

(56) References Cited

U.S. PATENT DOCUMENTS

| | | | | |
|---|---|---|---|---|
| 4,728,574 A | * | 3/1988 | Alesbury | ...................... 428/379 |
| 6,046,258 A | | 4/2000 | Katsube et al. | |
| 2009/0200272 A1 | | 8/2009 | Kanno et al. | |

FOREIGN PATENT DOCUMENTS

| | | |
|---|---|---|
| DE | 10 2007 055 667 A1 | 5/2008 |
| EP | 1 739 109 A1 | 1/2007 |
| FR | 2 927 465 A1 | 8/2009 |
| JP | 2-256110 A | 10/1990 |
| JP | 7-302535 A | 11/1995 |
| JP | 8-171847 A | 7/1996 |
| JP | 3098042 B2 | 8/2000 |
| JP | 2003-031063 A | 1/2003 |
| JP | 2004-182922 A | 7/2004 |
| WO | 98/36028 A1 | 8/1998 |
| WO | 2004/044818 A1 | 5/2004 |

OTHER PUBLICATIONS

Preliminary Search Report issued in corresponding French Patent Application No. 0900031 dated Jan. 29, 2011.

* cited by examiner

*Primary Examiner* — David W Wu
*Assistant Examiner* — Vu A Nguyen
(74) *Attorney, Agent, or Firm* — Rossi, Kimms & McDowell LLP

(57) ABSTRACT

An arc extinguishing resin processed article having excellent flame retardancy is disclosed, in which the contribution to rise in inner pressure is small, a pyrolysis gas that can efficiently extinguish an arc generated upon the interruption of a circuit can be generated, and heat resistance withstanding the rise in temperature generated in such a case and pressure resistance withstanding the rise in inner pressure are provided, and a circuit breaker using the arc extinguishing resin processed article are disclosed. The arc extinguishing resin processed article comprises a resin composition comprising (A) a polyolefin resin containing a hydroxyl group in an amount of from 0.2 to 0.7 mol per mol of a methylene group, a part of hydrogen atoms in a methylene chain being substituted with a hydroxyl group, (B) microcapsules containing water as a core material, and (C) a reactive organophosphorus flame retardant having a terminal unsaturated bond, the resin composition being molded and then subjected to radiation crosslinking.

9 Claims, 2 Drawing Sheets

ARC EXTINGUISHING RESIN PROCESSED ARTICLE AND CIRCUIT BREAKER USING THE SAME

BACKGROUND OF THE INVENTION

A. Field of the Invention

The present invention relates to an arc extinguishing resin processed article having flame retardancy used to extinguish an arc generated from contacts upon interruption of electric current of a circuit breaker or the like, and a circuit breaker using the same.

B. Description of the Related Art

In a circuit breaker or the like, when a contact point of a movable contact and a contact point of a fixed contact are opened when passing excess current or rated current, an arc is generated between the contact points. To extinguish this arc, an arc extinguishing apparatus equipped with an arc extinguishing chamber comprising an arc extinguishing member is generally provided around an arc generation part. The arc extinguishing member is pyrolyzed by the arc, and the arc is extinguished by a pyrolysis gas generated from the arc extinguishing member.

These arc extinguishing members mainly use thermosetting resins such as unsaturated polyester resins (see Japanese Patent No. 3098042) and melamine resins (see JP-A-2-256110), and thermoplastic resins such as polyolefin resins, polyamide resins and polyacetal resins (see JP-A-7-302535), as a matrix resin.

However, a thermosetting resin is liable to generate burrs when molded, and therefore has the problem that molding processability is poor as compared with a thermoplastic resin. Furthermore, a pyrolysis gas is generated from an arc extinguishing member upon the extinction of an arc, and therefore, an inner pressure in an arc extinguishing apparatus is increased. A thermosetting resin is relatively hard, but is liable to be broken and is poor in compression strength, and it was difficult in such a thermosetting resin to reduce a size of an arc extinguishing apparatus.

A thermoplastic resin does not tend to generate burrs when molded, but is poor in strength, pressure resistance and heat resistance, and an arc extinguishing member made with such resins have the tendency to deform or deteriorate with the passage of time. A thermoplastic resin having a large content of an aromatic ring, such as an aromatic polyamide resin, is excellent in strength, pressure resistance and heat resistance, but is liable to liberate free carbon upon burning. For this reason, where a thermoplastic resin having a large content of an aromatic ring is used, there is a possibility that an arc extinguishing apparatus is corroded with carbon, and there was a problem that insulating properties of the arc extinguishing apparatus are impaired.

To improve strength, pressure resistance, heat resistance and insulating properties of an arc extinguishing apparatus, attempts are made to add inorganic fillers such as reinforcing fibers or metal hydroxides to an insulating thermoplastic resin or thermosetting resin (see Japanese Patent No. 3098042, JP-A-2-256110, JP-A-7-302535, JP-A-8-171847 and WO98/36028). However, the amount of a pyrolysis gas generated tends to decrease with the increase in the content of inorganic fillers, and there is a problem that arc extinguishing properties are decreased.

On the other hand, JP-A-2003-31063 discloses a resin molded article for electrical insulation comprising microcapsules containing water as a core component, and inorganic fillers comprising alumina or aluminum hydroxide.

WO2003/044818 discloses a circuit breaker using a resin processed article obtained by applying electron beam treatment to a thermoplastic resin such as a polyester or a polyamide.

The molded article for electrical insulation disclosed in JP-A-2003-31063 comprises microcapsules containing water as a core component, and inorganic fillers comprising alumina or aluminum hydroxide. By this constitution, even where microcapsules are collapsed when the surface of a resin molded article is pyrolyzed upon the generation of an arc, so that inner water (water vapor) is released and free carbon is formed on the surface of a resin molded article, the free carbon is reacted with water in the presence of alumina as a catalyst to form carbon monoxide or hydrocarbon. Therefore, the amount of free carbon can be decreased, and it is possible that insulation properties of an arc extinguishing apparatus are difficult to be impaired. However, in JP-A-2003-31063, no investigation is made to attempt to suppress rise in inner pressure of an arc extinguishing apparatus by a pyrolysis gas generated upon the extinction of arc, and to attempt improving heat resistance and pressure resistance of an arc extinguishing apparatus.

WO2003/044818 improves strength, heat resistance and pressure resistance of a resin processed article by applying electron beam irradiation to a thermoplastic resin, but its effect was not sufficient. Specifically, permeation of electron beam may be insufficient in electron beam irradiation, and crosslinking might not be conducted uniformly. Furthermore, little or no improvement in arc extinguishing properties was recognized. Additionally, the rise in inner pressure of an arc extinguishing apparatus due to a pyrolysis gas generated upon the extinction of an arc cannot substantially be suppressed, and an arc extinguishing apparatus was liable to be broken due to the rise in inner pressure upon the extinction of an arc.

In recent years, the required level of flame retardancy required to a resin material used in a circuit breaker has increased. In improving flame retardancy, it is considered to use a flame retardant resin as a matrix resin in an arc extinguishing material. It is known that a halogen compound such as bromine is effective for the flame retardation of a resin, and resins with a halogen compound added are generally and widely used as a flame retardant resin. However, there was a possibility that a flame retardant resin containing a large amount of a halogen compound generates dioxins depending on combustion conditions.

The present invention is directed to overcoming or at least reducing the effects of one or more of the problems set forth above.

SUMMARY OF THE INVENTION

Accordingly, it is desirable to provide an arc extinguishing resin processed article having excellent flame retardancy, in which the rise in inner pressure is small, a pyrolysis gas that can efficiently extinguish an arc generated upon the interruption of a circuit can be generated, and heat resistance withstanding the rise in temperature generated in such a case and pressure resistance withstanding the rise in inner pressure are provided.

It is also desirable to provide a circuit breaker using the arc extinguishing resin processed article.

The arc extinguishing resin processed article of the present invention comprises a resin composition comprising (A) a polyolefin resin containing a hydroxyl group in an amount of from 0.2 to 0.7 mol per mol of a methylene group, a part of hydrogen atoms in a methylene chain being substituted with a hydroxyl group, (B) microcapsules containing water as a core material, and (C) a reactive organophosphorus flame retardant having a terminal unsaturated bond, the resin composition being molded and then subjected to radiation crosslinking.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
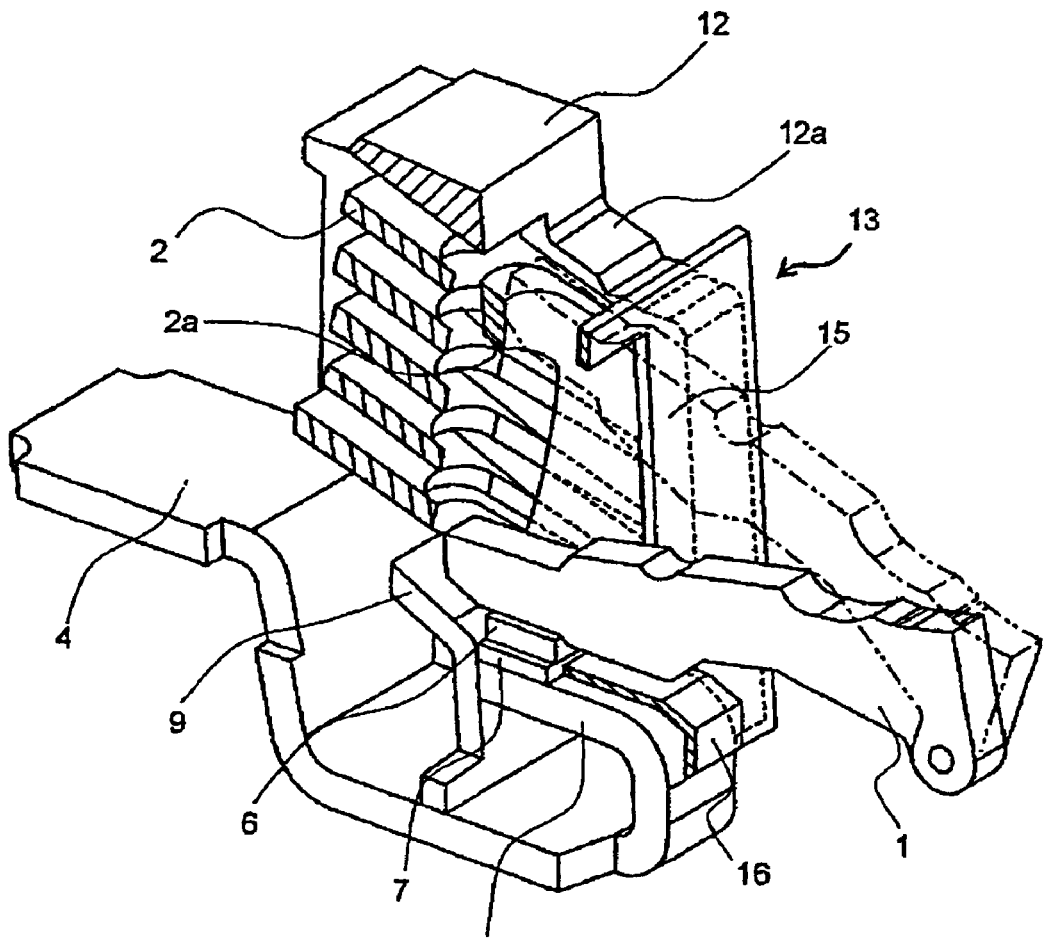
FIG. 1 is one example showing a broken perspective view of the circuit breaker of the present invention.

In the arc extinguishing resin processed article of the present invention, the terminal unsaturated bond of the reactive organophosphorus flame retardant (C) and the polyolefin resin (A) are reacted and crosslinked by radiation. Radiation has high permeability. Therefore, the polyolefin resin (A) is almost uniformly crosslinked in a three-dimensional network form. As a result, in the arc extinguishing resin processed article, a phase separation structure is fixed, and therefore heat resistance and mechanical strength are excellent. Furthermore, a flame retardant component is stably incorporated into a resin. Therefore, bleedout of flame retardant is small, and excellent flame retardancy can be exhibited over a long period of time.

The arc extinguishing resin processed article contains microcapsules (B) containing water as a core material and, furthermore, in the polyolefin resin (A), OH groups present at a side chain are liable to be dissociated by pyrolysis. Therefore, when the surface of the resin processed article is pyrolyzed by an arc, a pyrolysis gas having large amounts of hydrogen gas, $H_2O$, $O_2$ and O is generated. As a result, the arc can quickly be extinguished. Additionally, the content of components that contribute less to the extinction of an arc, such as the tar component, is small, and the rise in inner pressure of an arc extinguishing apparatus can be suppressed. At the time of the extinction of arc, the amount of free carbon generated, such as the tar component, is small. As a result, carbon is tends not to be deposited on the arc extinguishing apparatus, and insulating properties of the arc extinguishing apparatus are not impaired.

In the arc extinguishing resin processed article of the present invention, the resin composition preferably contains at least one inorganic filler selected from the group consisting of glass fibers, barium titanate whiskers, silica gel fine particles, boehmite, talc, kaolin clay, mica, magnesium carbonate and metal hydroxides in an amount of from 1 to 70% by mass. According to this embodiment, strength and pressure resistance of a resin processed article can be improved.

In the arc extinguishing resin processed article of the present invention, the polyolefin resin (A) is preferably an ethylene-vinyl alcohol copolymer.

In the arc extinguishing resin processed article of the present invention, the microcapsules (B) preferably contain water in a core material in an amount of from 5 to 100% by mass, and are contained in the resin composition in an amount of from 0.5 to 90% by mass.

According to each of the above embodiments, a pyrolysis gas having excellent arc extinguishing properties can be generated. As a result, an arc can quickly be extinguished and arc voltage is not impaired.

In the arc extinguishing resin processed article of the present invention, the reactive organophosphorus flame retardant (C) is preferably an organophosphorus compound represented by the following formulae (I) and/or (II), and is contained in the resin composition in an amount of from 0.5 to 20% by mass.

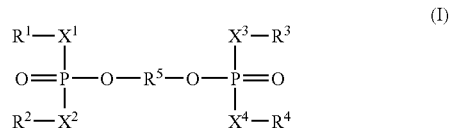

In the formula (I), $R^1$ to $R^4$ each represent $CH_2=CY^1—Y^2—$ or a monofunctional aromatic hydrocarbon group which may contain a hetero atom; $R^5$ represents a bifunctional aromatic hydrocarbon group which may contain a hetero atom; and $X^1$ to $X^4$ each represent a group selected from the group consisting of —O—, —NH— and —($CH_2=CY^1—Y^2$)N—, at least one of $X^1$ to $X^4$ contains —NH— or —($CH_2=CY^1—Y^2$)N—, and at least one of $R^1$ to $R^4$ and $X^1$ to $X^4$ contains $CH_2=CY^1—Y^2—$, wherein $Y^1$ represents hydrogen or a methyl group, and $Y^2$ represents an alkylene group having from 1 to 5 carbon atoms, or —COO—$Y^3$— wherein $Y^3$ represents an alkylene group having from 1 to 5 carbon atoms.

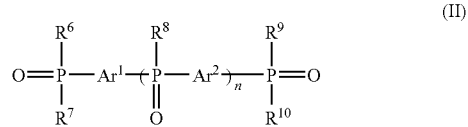

In the formula (II), at least one P—C bond is contained in one molecule; $Ar^1$ and $Ar^2$ each represent a bifunctional aromatic hydrocarbon group having 20 or less carbon atoms and not containing mobile hydrogen; n is an integer of from 0 to 2; $R^6$ to $R^{10}$ each represent a group selected from the group consisting of —$NHCH_2CH=CH_2$, —$N(CH_2CH=CH_2)_2$, —$OCH_2CH=CH_2$, —$CH_2CH=CH_2$, —$CH_2CH_2OCH=CH_2$, —($C_6H_4$)—$CH=CH_2$, —$O(C_6H_4)$—$CH=CH_2$, —$CH_2(C_6H_4)$—$CH=CH_2$, —NH($C_6H_4$)—$CH=CH_2$, —$N(CH_2CH=CH_2)$—($C_6H_4$)—$CH=CH_2$, —O—R—OOC—C(R')=$CH_2$, —NH—R—NHCO—C(R')=$CH_2$, and an aryl group having 12 or less carbon atoms, wherein R represents an alkylene group having from 2 to 5 carbon atoms and R' represents hydrogen or a methyl group; and at least one of $R^6$ to $R^{10}$ contains a —$CH=CH_2$ group or a —$C(CH_3)=CH_2$ group.

The reactive organophosphorus flame retardant (C) is energetically stable, and is difficult to vaporize when kneaded with a resin and molded. Furthermore, the reactive organophosphorus flame retardant (C) is difficult to decompose by heat or shearing, and therefore, molding processability is not impaired.

On the other hand, the circuit breaker of the present invention comprises a fixed contact having a fixed contact point, a movable contact which has a movable contact point contacting the fixed contact and performs a switching action to the fixed contact, and an arc extinguishing apparatus which extinguishes an arc generated when the fixed contact and the movable contact perform the switching action, wherein the arc extinguishing apparatus comprises the arc extinguishing resin processed article. According to the circuit breaker of the present invention, an arc generated from the contact point upon the interruption of electric current can efficiently be extinguished, and the rise in inner pressure of the arc extinguishing apparatus can be suppressed. As a result, a small-sized circuit breaker having excellent interruption performances such as the interruption of load or the interruption of short-circuit can be formed.

The arc extinguishing resin processed article of the present invention has excellent strength, pressure resistance, heat resistance, flame retardancy and molding processing and, additionally, generates a pyrolysis gas having high arc extinction function. Therefore, the arc extinguishing resin processed article can efficiently extinguish arc generated from contacts upon interruption of electric current, and can suppress rise in inner pressure of an arc extinguishing apparatus. As a result, the circuit breaker of the present invention using the arc extinguishing resin processed article can have a reduced size, and can have excellent interruption performances such as overload interruption or short-circuit interruption.

The arc extinguishing resin processed article of the present invention is obtained by applying radiation crosslinking to a resin composition comprising (A) a polyolefin resin containing a hydroxyl group (—OH) in an amount of from 0.2 to 0.7 mol per mol of a methylene group (—CH$_2$—), a part of hydrogen atoms in a methylene chain being substituted with a hydroxyl group, (B) microcapsules containing water as a core material, and (C) a reactive organophosphorus flame retardant having a terminal unsaturated bond, after molding.

The polyolefin resin (A) contains a hydroxyl group in an amount of from 0.2 to 0.7 mol per mol of a methylene group, and preferably contains a hydroxyl group in an amount of from 0.2 to 0.65 mol per mol of a methylene group. Where the hydroxyl group proportion is less than 0.2, it is difficult to generate a pyrolysis gas having excellent arc extinguishing properties. As a result, an arc is not quickly extinguished, and an inner pressure of an arc extinguishing apparatus tends to be increased upon the extinction of an arc. On the other hand, where the hydroxyl group proportion exceeds 0.7, heat resistance is decreased. Additionally, a pyrolysis temperature is decreased, and there is a tendency that molding processing by melt kneading becomes difficult.

The polyolefin resin (A) has a latent heat of decomposition of preferably 30 cal/g or more, and more preferably 40 cal/g or more. To increase latent heat of decomposition of the polyolefin resin (A), the content of hydroxyl group is increased. For example, a polyolefin resin having a hydroxyl group in an amount of from 0.2 to 0.7 mol per mol of a methylene group, in which part of the hydrogen atoms of the methylene chain are substituted with a hydroxyl group, has latent heat of decomposition of from 30 to 50 cal/g. The latent heat of decomposition of a resin can be measured by pyrolyzing a resin to be measured, under an inert atmosphere.

Such a polyolefin resin is preferably an ethylene-vinyl alcohol copolymer. The ethylene-vinyl alcohol copolymer is particularly preferred for the reason that arc extinguishing properties are excellent. However, a polyethylene alone has poor arc extinguishing properties, and a polyvinyl alcohol alone limits the molding processing method.

The microcapsules (B) contain water as a core material. The core material of the microcapsules (B) is water contained in an amount of preferably from 5 to 100% by mass, and more preferably from 20 to 100% by mass. By containing 5% by mass or more of water in the core material, a pyrolysis gas having a large content of hydrogen gas or H$_2$O and high arc extinguishing properties can be generated upon the distinction of arc.

The core material is contained in an amount of from 5 to 90% by mass, and preferably from 10 to 70% by mass, in the total amount of the microcapsules (B). Where the content of the core material is less than 5% by mass based on the total mass of the microcapsules (B), an effect of cooling an arc is not sufficiently exhibited. Where the content exceeds 90% by mass, the core material is liable to evaporate in the atmosphere due to the decrease of a coating film thickness of microcapsules, and an effect of cooling an arc by the core material upon the extinction of arc may not be sufficiently obtained.

The coating film of the microcapsules (B) is preferably constituted of a composition containing a styrene polymer, is more preferably constituted of a composition containing from 0.1 to 30% by mass of an epoxy polymer in the styrene polymer, and is particularly preferably constituted of a composition containing from 1 to 10% by mass of an epoxy polymer in the styrene polymer. Since the coating film is constituted of a styrene polymer, it is possible to contain water as a core material in microcapsules. Furthermore, since the coating film is constituted of a composition containing an epoxy polymer in the styrene polymer, a network structure of the coating film becomes dense, making it difficult to evaporate the core material in the atmosphere. As a result, a pyrolysis gas having higher contents of hydrogen gas and H$_2$O can be generated upon the extinction of an arc.

The particle diameter of the microcapsules (B) is preferably from 1 to 700 μm, and more preferably from 10 to 300 μm. When the particle diameter falls within the above range, it is easy to uniformly disperse the microcapsules in a molded article.

The microcapsules (B) are contained in the resin composition in an amount of preferably from 0.5 to 90% by mass, and more preferably from 30 to 70% by mass. Where the content of the microcapsules (B) in the resin composition is less than 0.5% by mass, the above effect is not @Tobtained, and where the content exceeds 90% by mass, strength of a molded article obtained is lacking.

The reactive organophosphorus flame retardant (C) is an organophosphorus compound having a terminal unsaturated bond, and is preferably an organophosphorus compound represented by the following formulae (I) and (II).

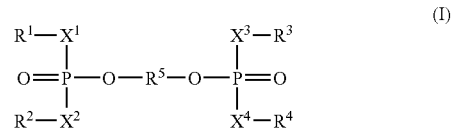

(I)

In the formula (I), $R^1$ to $R^4$ each represent CH$_2$=CY$^1$—Y$^2$— or a monofunctional aromatic hydrocarbon group which may contain a hetero atom; $R^5$ represents a bifunctional aromatic hydrocarbon group which may contain a hetero atom; and $X^1$ to $X^4$ each represent a group selected from —O—, —NH— and —(CH$_2$=CY$^1$—Y$^2$)N—, at least one of $X^1$ to $X^4$ contains —NH— or —(CH$_2$=CY$^1$—Y$^2$)N—, and at least one of $R^1$ to $R^4$ and $X^1$ to $X^4$ contains CH$_2$=CY$^1$—Y$^2$—, wherein $Y^1$ represents hydrogen or a methyl group, and $Y^2$ represents an alkylene group having from 1 to 5 carbon atoms, or —COO—Y$^3$— wherein $Y^3$ represents an alkylene group having from 1 to 5 carbon atoms.

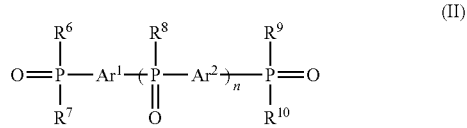
(II)

In the formula (II), at least one P—C bond is contained in one molecule; $Ar^1$ and $Ar^2$ each represent a bifunctional aromatic hydrocarbon group having 20 or less carbon atoms and not containing mobile hydrogen; n is an integer of from 0 to 2; $R^6$ to $R^{10}$ each represent a group selected from —NHCH$_2$CH=CH$_2$, —N(CH$_2$CH=CH$_2$)$_2$, —OCH$_2$CH=CH$_2$, —CH$_2$CH=CH$_2$, —CH$_2$CH$_2$OCH=CH$_2$, —(C$_6$H$_4$)—CH=CH$_2$, —O(C$_6$H$_4$)—CH=CH$_2$, —CH$_2$(C$_6$H$_4$)—CH=CH$_2$, —NH(C$_6$H$_4$)—CH=CH$_2$, —N(CH$_2$CH=CH$_2$)(C$_6$H$_4$)—CH=CH$_2$, —O—R—OOC—C(R')=CH$_2$, —NH—R—NHCO—C(R')=CH$_2$, and an aryl group having 12 or less carbon atoms, wherein R represents an alkylene group having from 2 to 5 carbon atoms and R' represents hydrogen or a methyl group; and at least one of $R^6$ to $R^{10}$ contains a —CH=CH$_2$ group or a —C(CH$_3$)=CH$_2$ group.

That is, the above organophosphorus compound is a compound containing at least one of —CH=CH$_2$ group and —C(CH$_3$)=CH$_2$ group as a terminal unsaturated group. This functional group is a functional group for bonding to the polyolefin resin (A) by irradiation with radiation. It is preferred that two or more terminal unsaturated bonds are contained in one molecule.

In the compound represented by the formula (I), specific examples of the CH$_2$=CY$^1$—Y$^2$— group include CH$_2$=CH—CH$_2$—, CH$_2$=CH—CH$_2$CH$_2$CH$_2$—, CH$_2$=C(CH$_3$)—CH$_2$—, CH$_2$=CHCOO—CH$_2$CH$_2$— and CH$_2$=C(CH$_3$)COO—CH$_2$CH$_2$—.

The monofunctional aromatic hydrocarbon group which may contain a hetero atom in $R^1$ to $R^4$ is preferably an aromatic hydrocarbon group having from 6 to 14 carbon atoms. Specific examples include —C$_6$H$_5$— (phenyl group), —C$_6$H$_5$OH— (hydroxyphenyl group), —C$_6$H$_5$—C$_6$H$_5$OH— (hydroxybiphenyl group), —CH$_2$C$_6$H$_5$— (benzyl group), -α-C$_{10}$H$_7$— (α-naphthyl group) and -β-C$_{10}$H$_7$— (β-naphthyl group).

The bifunctional aromatic hydrocarbon group which may contain a hetero atom in $R^5$ is preferably an aromatic hydrocarbon group having from 10 to 14 carbon atoms. Specific examples include -p-C$_6$H$_4$-p-C$_6$H$_4$—, -p-C$_6$H$_4$—CH$_2$-p-C$_6$H$_4$—, -p-C$_6$H$_4$—C(CH$_3$)$_2$-p-C$_6$H$_4$—, -p-C$_6$H$_4$—C(=O)-p-C$_6$H$_4$—, -p-C$_6$H$_4$—SO$_2$-p-C$_6$H$_4$— and 2,6-C$_{10}$H$_6$< (2,6-naphthylene group).

In the present invention, the aromatic hydrocarbon group includes not only an aromatic hydrocarbon group such as a phenyl group or -p-C$_6$H$_4$-p-C$_6$H$_4$— as described above, but a group containing a hetero atom such as oxygen or sulfur in addition to an aromatic hydrocarbon group, such as a hydroxyphenyl group or -p-C$_6$H$_4$—SO$_2$-p-C$_6$H$_4$— as described above.

Examples of the organophosphorus compound represented by the formula (I) include compounds represented by the following structural formulae (I-1) to (I-18).

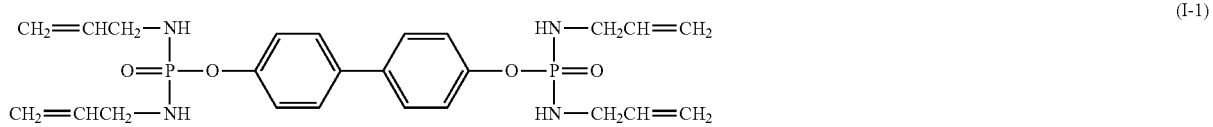
(I-1)

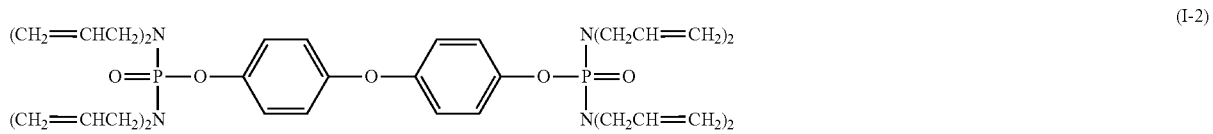
(I-2)

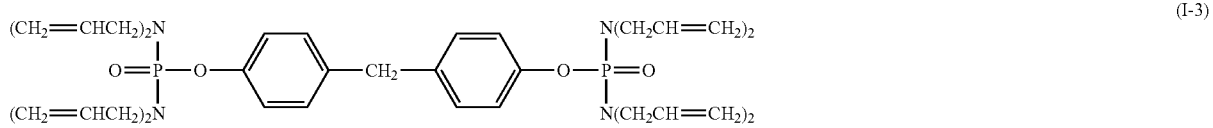
(I-3)

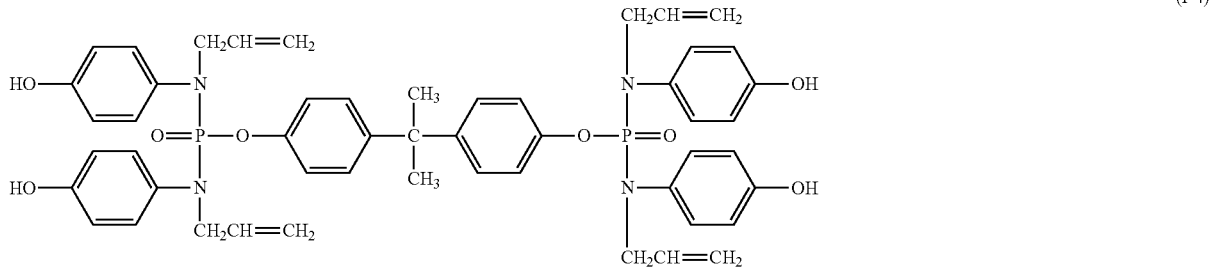
(I-4)

-continued
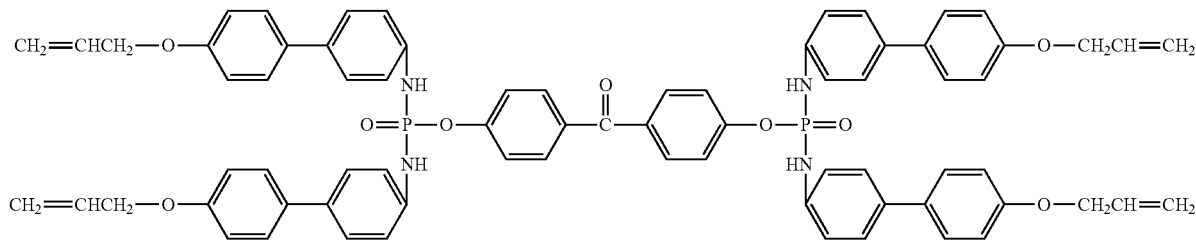
(I-5)
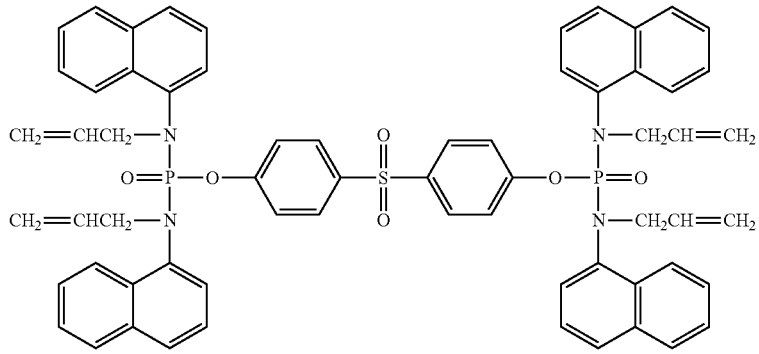
(I-6)
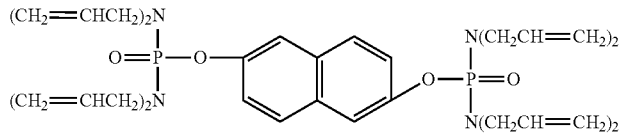
(I-7)
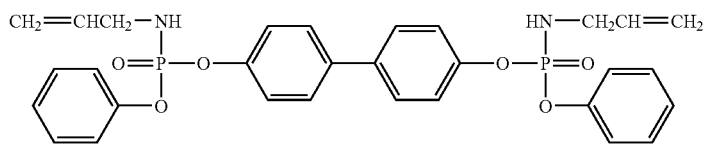
(I-8)
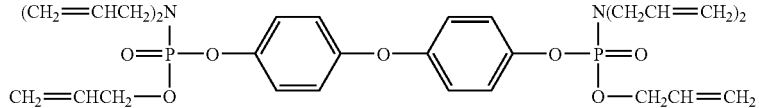
(I-9)
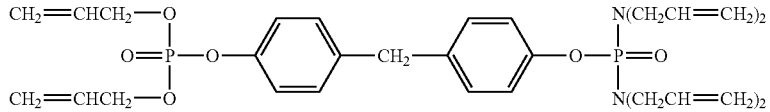
(I-10)
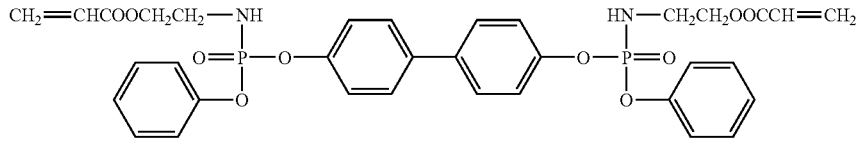
(I-11)
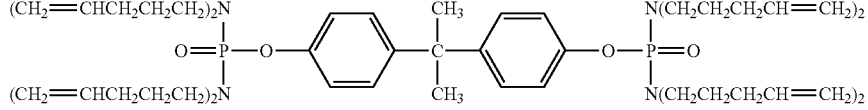
(I-12)
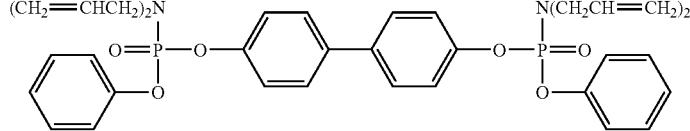
(I-13)

-continued

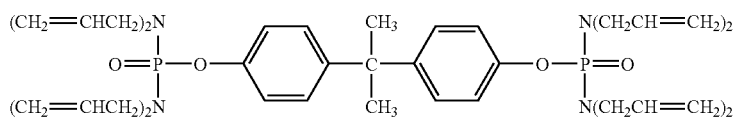
(I-14)

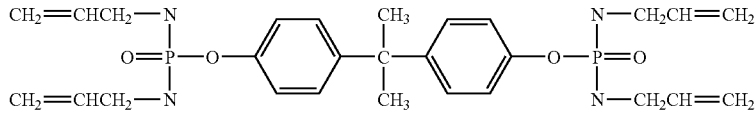
(I-15)

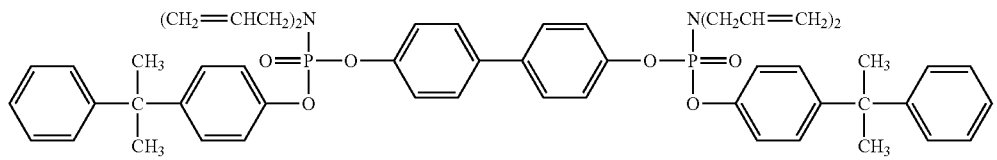
(I-16)

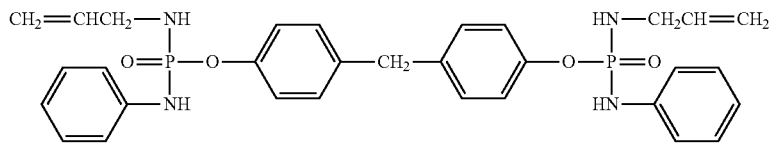
(I-17)

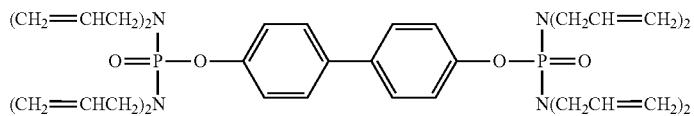
(I-18)

The above compounds can be synthesized by the method described in, for example, WO2005/012415. For example, the compound of (I-1) above can be obtained by adding phosphorus oxychloride to dimethyl acetamide (DMAc), adding dropwise a solution of DMAc dissolved therein 4,4'-biphenyl alcohol and triethylamine to the resulting solution to react, and then reacting a mixed solution of allylamine and triethylamine.

Examples of the aryl group having 12 or less carbon atoms in the compound represented by the formula (II) include —$C_6H_5$ (phenyl group), —$C_6H_5OH$ (hydroxyphenyl group), —$C_6H_5$—$C_6H_5OH$ (hydroxybiphenyl group), -α-$C_{10}H_7$ (α-naphthyl group) and -β-$C_{10}H_7$ (β-naphthyl group).

Examples of the bifunctional aromatic hydrocarbon group which does not contain mobile hydrogen, having 20 or less carbon atoms of $Ar_1$ and $Ar_2$ include p-$C_6H_4$—, p-$C_6H_4$—O—, —O-p-$C_6H_4$—O—, -p-$C_6H_4$-p-$C_6H_4$—, -p-$C_6H_4$—$CH_2$-p-$C_6H_4$—, -p-$C_6H_4$—$C(CH_3)_2$-p-$C_6H_4$—, -p-$C_6H_4$—C(=O)-p-$C_6H_4$—, -p-$C_6H_4$—$SO_2$-p-$C_6H_4$— and 2,6-$C_{10}H_6$< (2,6-naphthylene group). The mobile hydrogen means high-reactive hydrogen contained in a functional group, which is liable to form hydrogen bond and generates hydrogen by easily reacting with metallic sodium, sodium halide or the like at ordinary temperatures, such as —OH (hydroxyl group), —NHCO— (amide bond) or —NHCOO— (urethane bond).

Examples of the organophosphorus compound represented by the formula (II) include compounds shown by the following structural formulae (II-1) to (II-23). Of those, (II-1) to (II-12) are compounds wherein n is zero, that is, two phosphorus atoms in one molecule. Furthermore, (II-13) to (II-20) are compounds wherein n is 1, that is, three phosphorus atoms in one molecule. (II-21) to (II-23) are compounds wherein n is 2, that is, four phosphorus atoms in one molecule.

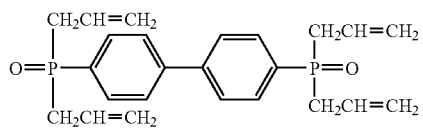
(II-1)

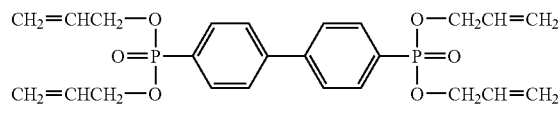
(II-2)

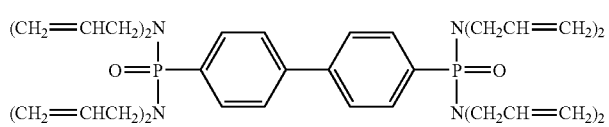
(II-3)

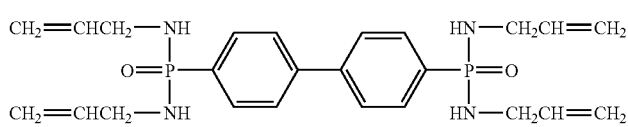
(II-4)

-continued
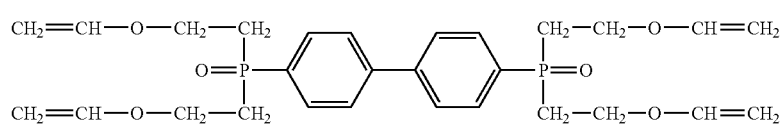
(II-5)
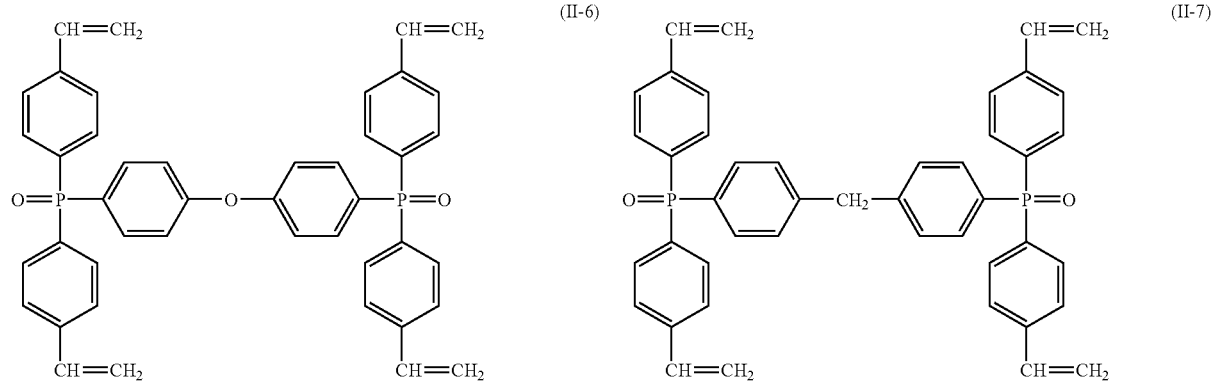
(II-6)
(II-7)
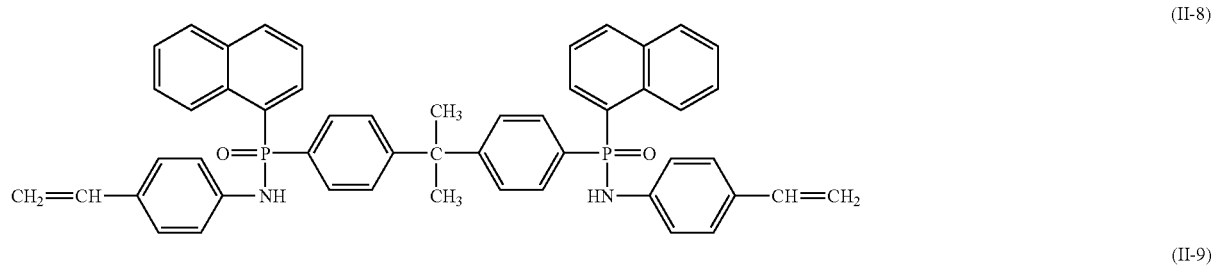
(II-8)
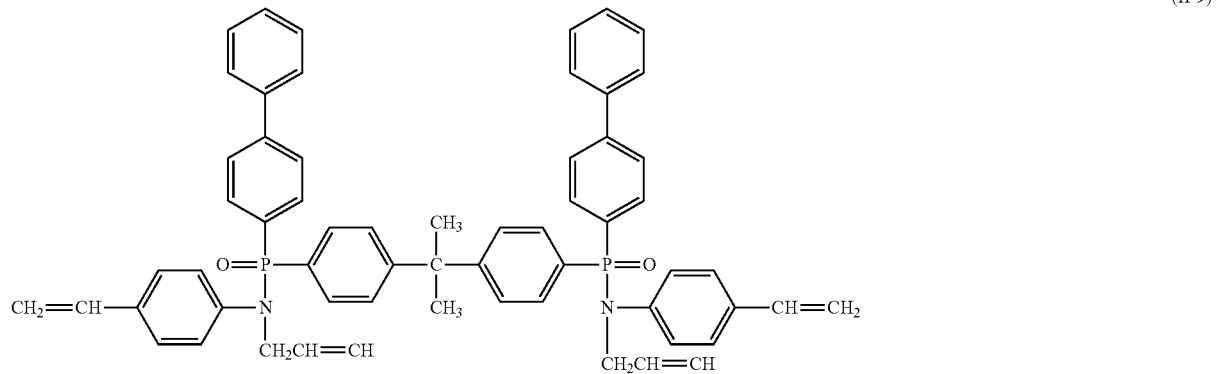
(II-9)
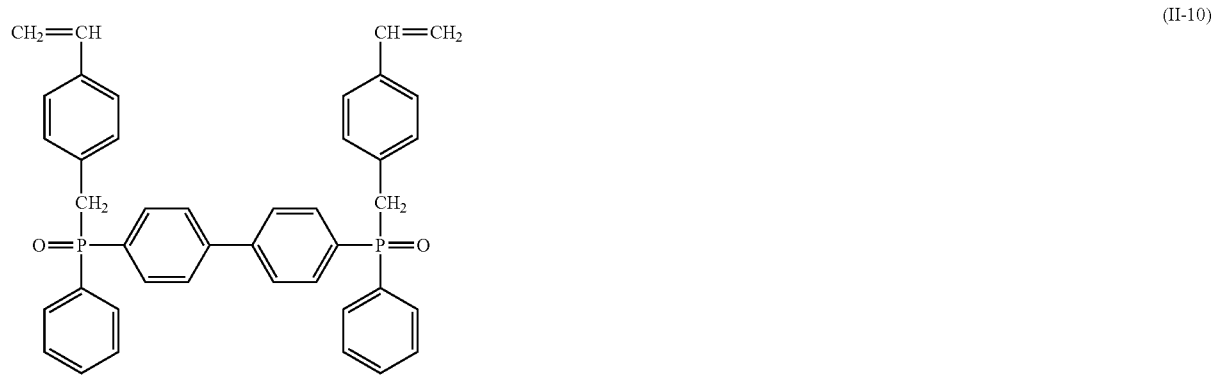
(II-10)
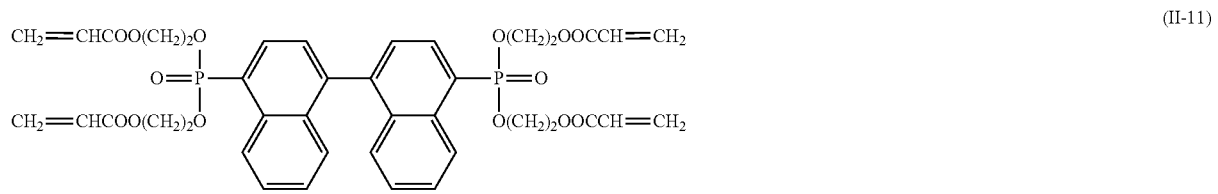
(II-11)

-continued

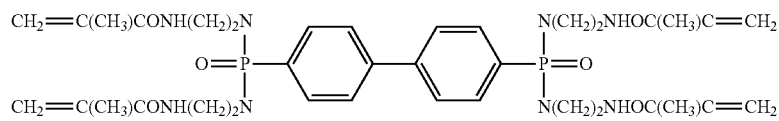
(II-12)

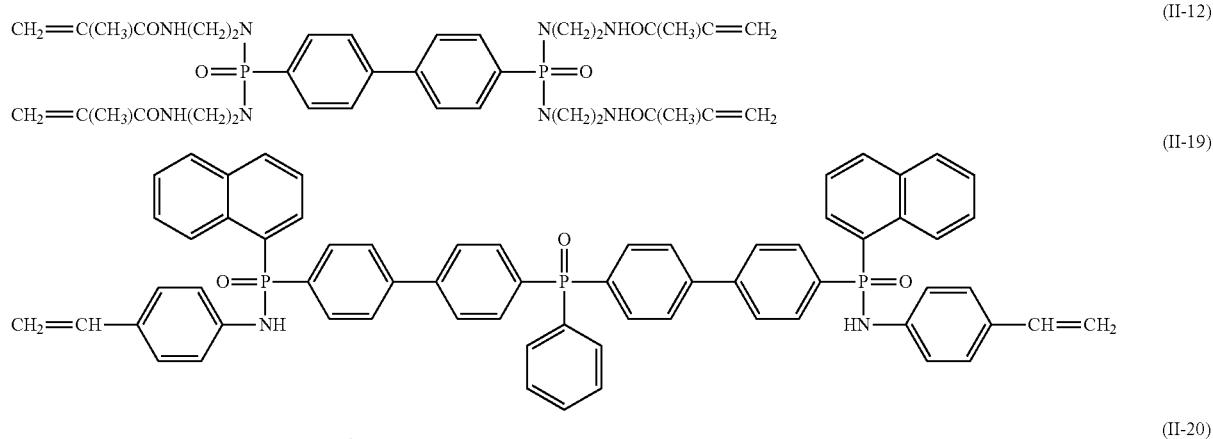
(II-19)

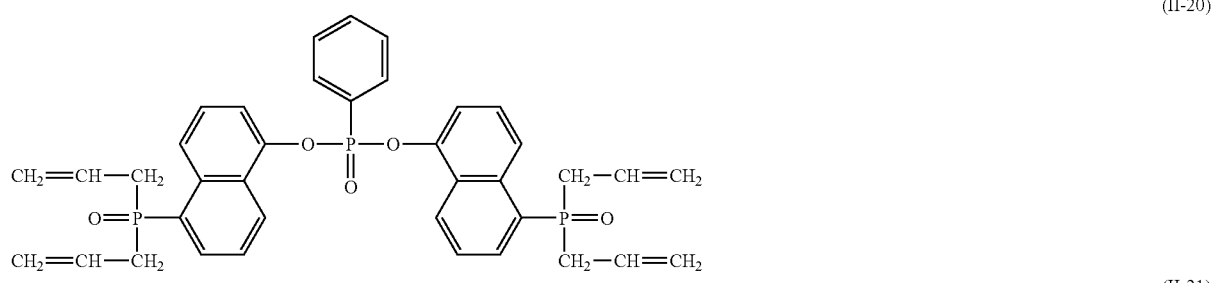
(II-20)

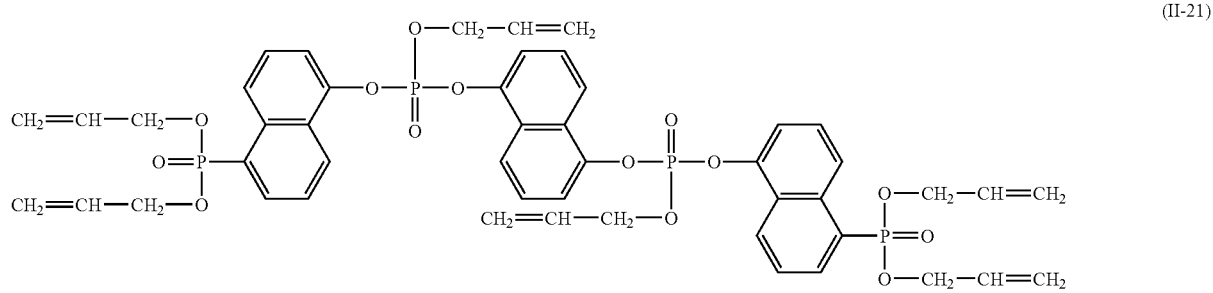
(II-21)

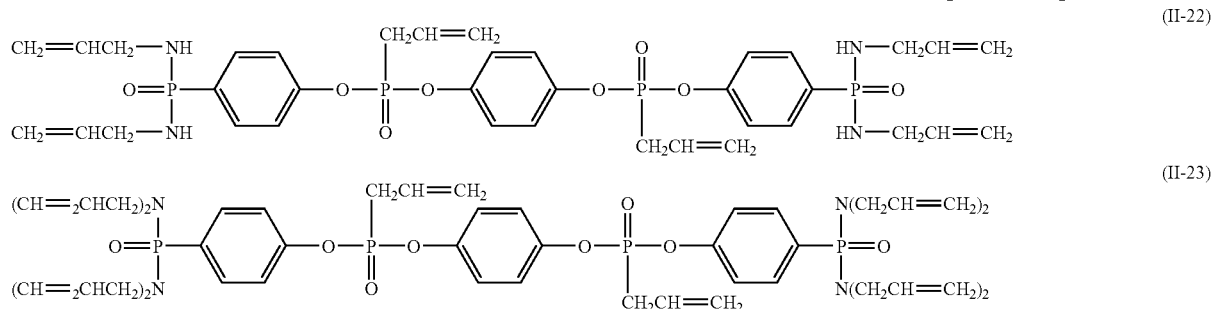
(II-22)

(II-23)

The above compounds can be synthesized by the method described in, for example, WO2005/087852. For example, the compound of the above (II-1) can be synthesized by using 4,4'-dichlorobiphenyl as a starting material, reacting this with phosphorus oxychloride, and further reacting with allyl bromide to introduce an unsaturated group into the terminal.

The reactive organophosphorus flame retardant (C) is contained in the resin composition in an amount of preferably from 0.5 to 20% by mass, and more preferably from 8 to 20% by mass. Where the content of the reactive organophosphorus flame retardant (C) in the resin composition is less than 0.5% by mass, flame retardancy cannot almost be improved, and additionally, crosslinking density of the resin composition is poor. As a result, physical properties such as strength, pressure resistance and heat resistance may not be improved. Where the content exceeds 20% by mass, the reactive organophosphorus flame retardant is excessive, and there is a possibility that unreacted monomer and decomposition gas of the reactive organophosphorus flame retardant are generated, and an oligomerized product bleeds out.

The resin composition used in the arc extinguishing resin processed article of the present invention preferably contains at least one inorganic filler (D) selected from the group consisting of reinforced fibers, barium titanate whiskers, silica gel fine particles, boehmite, talc, kaolin clay, mica, magnesium carbonate and metal hydroxides. By containing those inorganic fillers, strength, pressure resistance and heat resistance of the arc extinguishing resin processed article are improved, and additionally, dimensional stability can be improved.

Examples of the reinforcing fiber include glass fibers, carbon fibers and metal fibers. Glass fibers are preferably used from the standpoints of strength and adhesion to the resin or the inorganic filler. Those reinforcing fibers can be used alone or as mixtures of two or more thereof, and may be fibers treated with the conventional surface-treating agent such as a silane coupling agent. Furthermore, it is preferred that the glass fibers are surface-treated, and further covered with a resin. By this, adhesion to the resin can further be improved.

When the metal hydroxide has a particle diameter of from 1 to 10 μm, dispersibility in the resin is improved. Aluminum hydroxide, boehmite and magnesium hydroxide are preferably used for the reason that the rise in inner pressure can be suppressed.

The inorganic filler (D) is contained in the resin composition in an amount of preferably from 1 to 70% by mass, and more preferably from 20 to 70% by mass. Where the content of the inorganic filler (D) is less than 1% by mass, an effect by the inorganic filler is not substantially obtained, and where the content exceeds 70% by mass, the amount of a pyrolysis gas generated is reduced, and as a result, arc extinguishing properties deteriorate.

The resin composition used in the arc extinguishing resin processed article of the present invention can contain various additives generally used other than the above, for examples, additives such as crystal nucleating agents, colorants, antioxidants, release agents, plasticizers, heat stabilizers, lubricants or ultraviolet inhibitors, in a range that physical properties such as heat resistance, pressure resistance, arc extinguishing properties or strength, that are the object of the present invention, are not significantly impaired.

The arc extinguishing resin processed article of the present invention is obtained by molding the resin composition and then irradiating the molded article with radiation.

A method for molding the resin composition uses the conventional methods. For example, the resin processed article can be obtained by, for example, melt kneading the resin composition, followed by pelletization, and then molding by the conventional injection molding, extrusion molding, vacuum molding or inflation molding. The melt kneading can be conducted by using the general melt kneading processing machine such as a single screw or twin screw extruder, Banbury mixer, a kneader or mixing rolls. The kneading temperature is preferably from 170 to 230° C. Where the kneading temperature is lower than 170° C., melt kneading is difficult, and where the kneading temperature exceeds 230° C., hydroxyl groups of the resin composition are dissociated, thereby decreasing arc extinguishing properties.

The arc extinguishing resin processed article of the present invention can be obtained by applying radiation irradiation to the resin molded article thus obtained. The radiation has high permeability. Therefore, the resin composition can be crosslinked substantially uniformly, and this can make strength, pressure resistance and heat resistance of the molded article good.

α-Ray, γ-ray, X-ray, ultraviolet ray and the like can be utilized as the radiation with which a resin molded article is irradiated, and γ-ray is preferred for the reasons that permeability is strong, and irradiation can be conducted uniformly.

Irradiation dose of the radiation is preferably 10 kGy or more, and more preferably from 10 to 45 kGy. The arc extinguishing resin processed article having excellent physical properties as above is obtained by crosslinking when the irradiation dose falls within this range. Where the irradiation dose is less than 10 kGy, formation of a three-dimensional network structure by crosslinking is heterogeneous, and there is a possibility that unreacted crosslinking agent bleeds out. On the other hand, where the irradiation dose exceeds 45 kGy, inner strain of a resin processed article due to oxidative decomposition product remains, and there is a possibility at this generates deformation, shrinkage or the like.

The arc extinguishing resin processed article of the present invention thus obtained is excellent in strength, pressure resistance, heat resistance, arc extinguishing properties and flame retardancy, and can preferably be used as an arc extinguishing apparatus of a circuit breaker.

The circuit breaker of the present invention is described below.

The circuit breaker of the present invention comprises a fixed contact having a fixed contact point, a movable contact which has a movable contact point contacting the fixed contact and performs a switching action to the fixed contact, and an arc extinguishing apparatus comprising the arc extinguishing resin processed article, which extinguishes an arc generated when the fixed contact and the movable contact perform the switching action.

Figure 2:
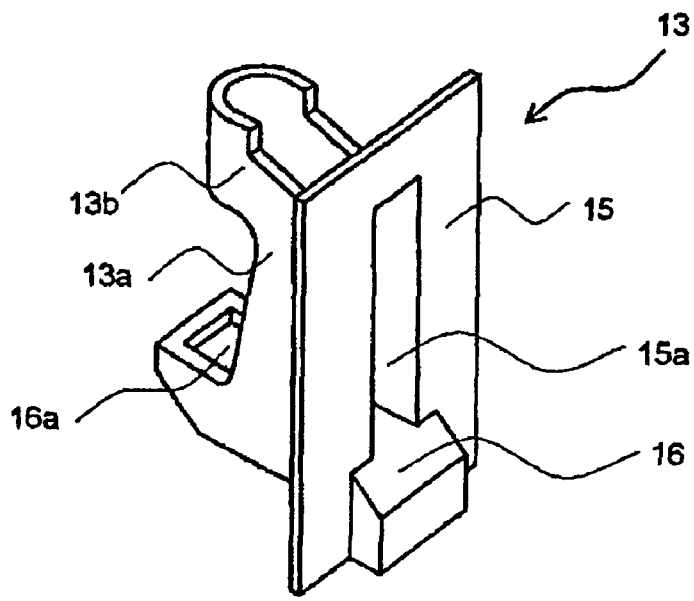
FIG. 2 is a perspective view of an arc extinguishing chamber used in the circuit breaker.
Figure 3:
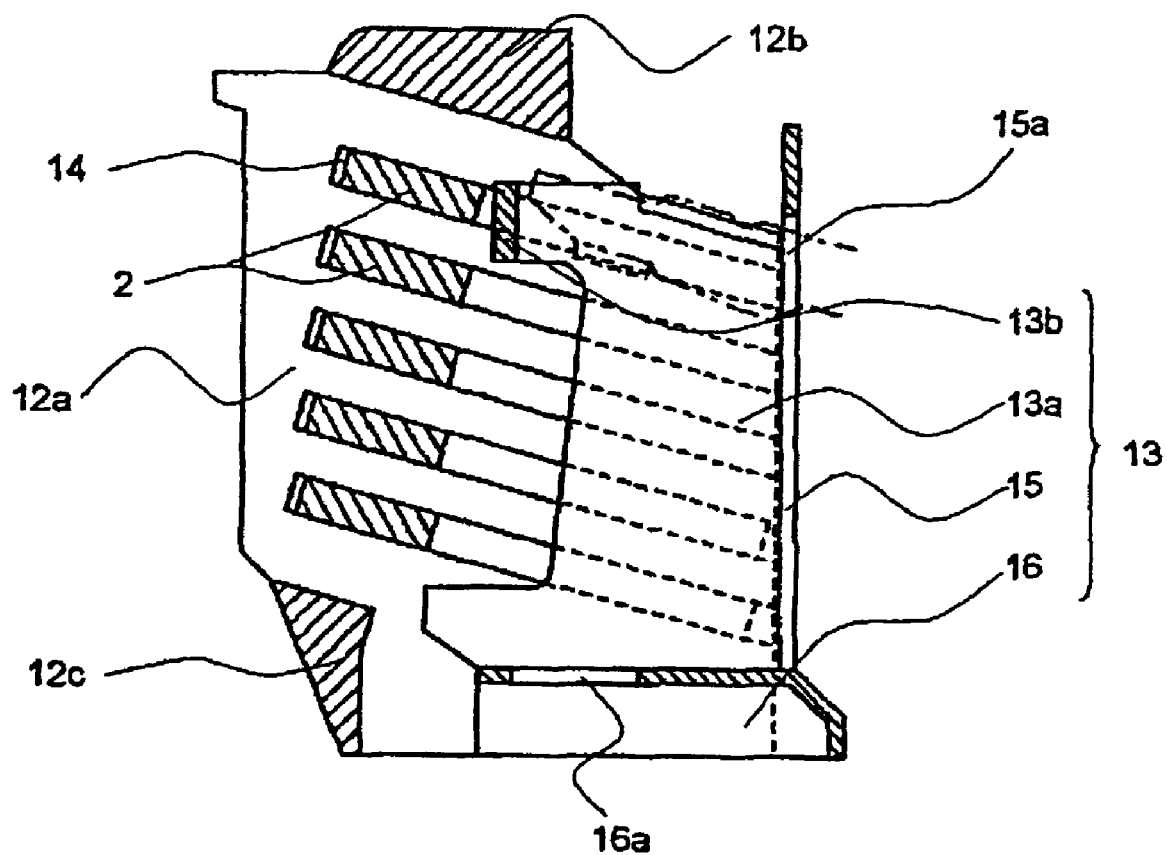
FIG. 3 is a cross-sectional view of the arc extinguishing apparatus used in the circuit breaker.

One example of such a circuit breaker is shown in FIGS. 1 to 3 as the specific example. FIG. 1 is a broken perspective view of a circuit breaker, FIG. 2 is a perspective view of an arc extinguishing apparatus, and FIG. 3 is a cross-sectional view of a circuit breaker.

In FIG. 1, the edge opposite fixed contact 5 having integrally formed therewith power source side terminal 4 is folded back in U-shape so as to be along movable contact 1, and fixed contact point 7 contacting movable contact point 6 of movable contact 1 is provided at the tip of folding back portion 5a. Furthermore, arc horn 9 guiding an arc generated between the movable and fixed contact points 6 and 7 toward an arc extinguishing apparatus is provided on fixed contact 5.

The arc extinguishing apparatus is constituted of grid 2 and arc extinguishing chamber 13. Plural grids 2 are piled on insulating material 12 with a given distance, and it is constituted such that movable contact 1 performs a switching action between a closed position shown by a solid line and an open position shown by a broken line in FIG. 1 through V-shaped notch 2a formed on grid 2. Furthermore, arc extinguishing chamber 13 formed by the arc extinguishing resin processed article of the present invention is provided between movable contact 1 and grid 2.

In FIGS. 1 and 3, insulating material 12 comprises a matched pair of side walls 12a, and connections 12b and 12c that connect the side walls each to each at the upper part and the lower part, and is integrally molded by an arc-resistant melamine molding resin. Rectangular sectional groove 14 is formed on the inner surface facing the right and left side walls 12a in multistage so as to obliquely rise from movable contact 1 side end face (right side end face of FIG. 3) of side wall 12a, and grid 2 is pressed into groove 14 so as to bridge right and left side walls 12a.

On the other hand, arc extinguishing chamber 13 is provided with a matched pair of side walls 13a, and front walls 13b connecting the upper ends of right and left side walls 13a in an arc shape along notch 2a of grid 2. Partition wall 15 partitioning an arc extinguishing apparatus and a switching mechanism, and an insulating cover covering the upper face of movable contact 1 are integrally molded in arc extinguishing chamber 13. Slit 15a is provided on partition wall 15 along a switching action path of movable contact 1. Window 16a exposing fixed contact point 7 is provided on insulating cover 16. Arc extinguishing chamber 13 is that partition wall 15 is combined with the inner side of insulating material 12 from the right side of FIG. 3 so as to contact the edge face of insulating material side wall 12a, supported on fixed contact 5 through insulating cover 16, and fixed by holding with a main body cover not shown of the circuit breaker. In this state, side wall 13a of arc extinguishing chamber 13 covers both leg portions (both sides of notch 2a) of grid 2 positioned at both sides of movable contact 1, from the inner side, and front wall 13b is positioned at a back portion of notch 2a of uppermost grid 2 as shown in FIG. 3.

In the above constitution, an arc is generated between movable and fixed contact points 6 and 7 upon the interruption of electric current, and this arc is drawn in grid 2 and extinguished. In this case, both leg portions of grid 2 are covered with side wall 13a of arc extinguishing chamber 13 from the inside, and shielded from the arc. As a result, this portion is prevented from melting and scattering by arc, and additionally, a pyrolysis gas having high arc extinguishing properties is generated from side wall 13a close to the arc, and cooling of the arc is promoted, thereby quickly extinguishing the arc.

The present invention is described in more detail by reference to the following Examples, but the invention is not construed as being limited thereto.

Example 1

70 parts by mass of a polyolefin resin (trade name: EVAL-L104B, manufactured by Kuraray Co., Ltd.) containing 0.58 mol of hydroxyl group per mol of methylene group, 20 parts by mass of microcapsules (manufactured by Nissei Technica Co., Ltd.) wherein a capsule coating film is a polystyrene and water is contained as a core material in an amount of 95%, and 10 parts by mass of a reactive organophosphorus flame retardant represented by the formula (I-14) were added and kneaded using a side-flow type twin-screw extruder (manufactured by Japan Steels Works, Ltd.) at 220° C. to obtain resin pellets. The resin pellets were dried at 80° C. for 7 hours, and then molded using an injection molding machine (α50C, manufactured by FANUC) under the conditions of a resin temperature of 215° C. and a mold temperature of 50° C. The molded article was irradiated with γ ray at a dose of 25 kGy using cobalt 60 as a radiation source to obtain an arc extinguishing resin processed article of Example 1.

Example 2

50 parts by mass of a polyolefin resin (trade name: EVAL-L104B, manufactured by Kuraray Co., Ltd.) containing 0.58 mol of hydroxyl group per mol of methylene group, 15 parts by mass of microcapsules (manufactured by Nissei Technica Co., Ltd.) wherein a capsule coating film is a polystyrene and water is contained as a core material in an amount of 95%, 10 parts by mass of magnesium hydroxide (trade name: N-4, manufactured by Konoshima Chemical Co., Ltd.), 20 parts by mass of glass fibers (trade name: 03.JAFT2Ak25, manufactured by Asahi Fiber Glass Co., Ltd.) and 5 parts by mass of a reactive organophosphorus flame retardant represented by the formula (II-3) were added and kneaded using a side-flow type twin-screw extruder (manufactured by Japan Steels Works, Ltd.) at 220° C. to obtain resin pellets. The resin pellets were dried at 80° C. for 7 hours, and then molded using an injection molding machine (α50C, manufactured by FANUC) under the conditions of a resin temperature of 215° C. and a mold temperature of 50° C. The molded product was irradiated with γ ray in a dose of 25 kGy using cobalt 60 as a radiation source to obtain an arc extinguishing resin processed article of Example 2.

Example 3

52 parts by mass of a polyolefin resin (trade name: EVAL-L104B, manufactured by Kuraray Co., Ltd.) containing 0.58 mol of hydroxyl group per mol of methylene group, 20 parts by mass of microcapsules (manufactured by Nissei Technica Co., Ltd.) wherein a capsule coating film is a polystyrene and water is contained as a core material in an amount of 95%, 20 parts by mass of magnesium hydroxide (trade name: N-4, manufactured by Konoshima Chemical Co., Ltd.) and 8 parts by mass of a reactive organophosphorus flame retardant represented by the formula (II-3) were added and kneaded using a side-flow type twin-screw extruder (manufactured by Japan Steels Works, Ltd.) at 220° C. to obtain resin pellets. The resin pellets were dried at 80° C. for 7 hours, and then molded using an injection molding machine (α50C, manufactured by FANUC) under the conditions of a resin temperature of 215° C. and a mold temperature of 50° C. The molded product was irradiated with γ ray in a dose of 25 kGy using cobalt 60 as a radiation source to obtain an arc extinguishing resin processed article of Example 3.

Comparative Example 1

Resin pellets were obtained by kneading under the same conditions as in Example 1, except that the reactive organophosphorus flame retardant was not used. The resin pellets obtained were dried at 80° C. for 7 hours, and then molded using an injection molding machine (α50C, manufactured by FANUC) under the conditions of a resin temperature of 215° C. and a mold temperature of 50° C. to obtain an arc extinguishing resin processed article of Comparative Example 1.

Comparative Example 2

Resin pellets were obtained by kneading under the same conditions as in Example 2, except that the reactive organophosphorus flame retardant was not used. The resin pellets obtained were dried at 80° C. for 7 hours, and then molded using an injection molding machine (α50C, manufactured by FANUC) under the conditions of a resin temperature of 215° C. and a mold temperature of 50° C. to obtain an arc extinguishing resin processed article of Comparative Example 2.

Comparative Example 3

An arc extinguishing resin processed article of Comparative Example 3 was obtained in the same manner as in Example 2, except that an addition type organophosphorus flame retardant not having reactivity (trade name: HCA-HQ, manufactured by Sanko Chemical Industry Co., Ltd.) was used in place of the reactive organophosphorus flame retardant.

Comparative Example 4

An arc extinguishing resin processed article of Comparative Example 4 was obtained in the same manner as in Example 2, except that a bromine flame retardant (trade name: Great Lakes pdbs-80, manufactured by Great Lakes) was used in place of the reactive organophosphorus flame retardant.

Comparative Example 5

An arc extinguishing resin processed article of Comparative Example 5 was obtained in the same manner as in Example 2, except that a polyethylene resin (trade name: HJ362, manufactured by Nippon Polyethylene Corporation) was used in place of the polyolefin resin (trade name: EVAL-L104B, manufactured by Kuraray Co., Ltd.) containing 0.58 mol of hydroxyl group per mol of methylene group.

Comparative Example 6

25 parts by mass of an unsaturated polyester resin (trade name: 7527, manufactured by U-PICA Company, Ltd.), 35 parts by mass of $Al(OH)_3$, 5 parts by mass of a styrene-vinyl acetate copolymer, 0.3 parts by mass of t-butyl peroxide Z as a polymerization initiator, and 4.7 parts by mass of a viscosity modifier were kneaded with a kneader, and 30 parts by mass of glass fibers (trade name 0.3.JAFTAk25, manufactured by Asahi Fiber Glass Co., Ltd.) were added and dispersed while kneading, thereby obtaining a bulk molding compound. This bulk molding compound was molded, and subjected to polymerization reaction at from 140 to 150° C. to obtain an arc extinguishing resin processed article of Comparative Example 6.

Molding processability of the arc extinguishing resin processed articles of Examples 1 to 3 and Comparative Examples 1 to 6 was evaluated. Furthermore, each arc extinguishing resin processed article was used as an arc extinguishing chamber 13 of a circuit breaker of FIG. 1, and short-circuit test, heat resistance test and flame retardancy test were conducted.

The short-circuit test was conducted as follows. In a closed state, electricity was passed under the condition of three-phase 440 V/50 kA, and a movable contact was opened to generate arc current. Interrupting properties (arc extinguishing properties) of this arc current, and the presence or absence of breakage (inner pressure property) and surface state (heat resistance) of an arc extinguishing apparatus were confirmed.

The interrupting properties were considered to be "acceptable" when short-circuit current was interrupted.

The molding processability was considered to be "acceptable" when the presence or absence of problems such as foaming or sag was visually evaluated and was not visually confirmed.

The flame retardancy was judged as follows. A test specimen (length: 5 inches, width: ½ inch, thickness: 3.2 mm) was prepared according to UL-94 test. The test specimen was vertically attached, and combustion time after burning with a Bunsen burner for 10 seconds was recorded. After fire extinction, second burning for 10 second was conducted, and the combustion time after burning was recorded. The flame retardancy was judged according to UL-94 test by the total of combustion times, red-hot combustion (glowing) time after second fire extinction, and the presence or absence of drips that ignites cotton.

The metal contamination was considered to be "acceptable" when contact resistance after allowing to stand for 300 hours under the environment at 120° C. was measured, and the contact resistance value was 50 mΩ or less.

The above test results are shown in Table 1 below.

TABLE 1

| | Short-circuit test results | | Heat | |
|---|---|---|---|---|
| | Interrupting property (Arc extinguishing property) | Breakage state (Inner pressure property) | resistance (Surface state) | Molding processability |
| Example 1 | Acceptable (Good interrupting performance) | Acceptable (No breakage) | Good surface | Good |
| Example 2 | Acceptable (Good interrupting performance) | Acceptable (No breakage) | Good surface | Good |
| Example 3 | Acceptable (Good interrupting performance) | Acceptable (No breakage) | Good surface | Good |
| Comparative Example 1 | Acceptable (Good interrupting performance) | Breakage | Good surface | Good |
| Comparative Example 2 | Acceptable (Good interrupting performance) | Breakage | Good surface | Good |
| Comparative Example 3 | Unacceptable | Breakage | Good surface | Good |
| Comparative Example 4 | Unacceptable | Breakage | Good surface | Good (Inorganic material decomposed) |
| Comparative Example 5 | Acceptable | Breakage | Good surface | Good (Burr was generated) |
| Comparative Example 6 | Acceptable | Breakage | Good surface | Good |

Thus, an arc extinguishing resin processed article having flame retardancy has been described according to the present invention. Many modifications and variations may be made to the techniques and structures described and illustrated herein without departing from the spirit and scope of the invention. Accordingly, it should be understood that the methods and devices described herein are illustrative only and are not limiting upon the scope of the invention.

This application is based on and claims priority to Japanese Patent Application 2008-129232, filed on May 16, 2008. The disclosure of the priority application in its entirety, including the drawings, claims, and the specification thereof, is incorporated herein by reference.

What is claimed is:

1. An arc extinguishing resin processed article comprising a resin composition comprising:
   (A) a polyolefin resin that has hydroxyl group substituted for a portion of hydrogen atoms in the methylene chain and that contains 0.2 to 0.7 mole hydroxyl group per mole methylene group,
   (B) microcapsules containing water as a core material, and
   (C) a reactive organophosphorus flame retardant having a terminal unsaturated bond,
   the resin composition being molded and then subjected to radiation crosslinking.

2. The arc extinguishing resin processed article as claimed in claim 1, wherein the resin composition additionally comprises:
   (D) at least one inorganic filler selected from the group consisting of glass fibers, barium titanate whiskers, silica gel fine particles, boehmite, talc, kaolin clay, mica, magnesium carbonate and metal hydroxides in an amount of from 1 to 70% by mass.

3. The arc extinguishing resin processed article as claimed in claim 1, wherein the polyolefin resin (A) is an ethylene-vinyl alcohol copolymer.

4. The arc extinguishing resin processed article as claimed in claim 1, wherein the microcapsules (B) contain water in a core material in an amount of from 5 to 100% by mass, and are contained in the resin composition in an amount of from 0.5 to 90% by mass.

5. The arc extinguishing resin processed article as claimed in claim 1, wherein the reactive organophosphorus flame retardant (C) is an organophosphorus compound represented by the following formulae (I) or (II), and is contained in the resin composition in an amount of from 0.5 to 20% by mass:

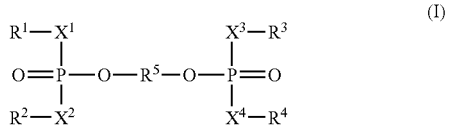

(I)

wherein $R^1$ to $R^4$ each represent $CH_2=CY^1-Y^2-$ or a monofunctional aromatic hydrocarbon group which may contain a hetero atom; $R^5$ represents a bifunctional aromatic hydrocarbon group which may contain a hetero atom; and $X^1$ to $X^4$ each represent a group selected from the group consisting of $-O-$, $-NH-$ and $-(CH_2=CY^1-Y^2)N-$, at least one of $X^1$ to $X^4$ contains $-NH-$ or $-(CH_2=CY^1-Y^2)N-$, and at least one of $R^1$ to $R^4$ and $X^1$ to $X^4$ contains $CH_2=CY^1-Y^2-$, wherein $Y^1$ represents hydrogen or a methyl group, and $Y^2$ represents an alkylene group having from 1 to 5 carbon atoms, or $-COO-Y^3-$ wherein $Y^3$ represents an alkylene group having from 1 to 5 carbon atoms;

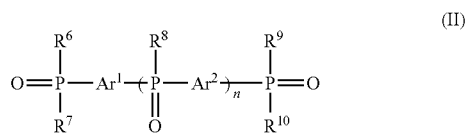

(II)

wherein at least one P—C bond is contained in one molecule; $Ar^1$ and $Ar^2$ each represent a bifunctional aromatic hydrocarbon group having 20 or less carbon atoms and not containing mobile hydrogen; n is an integer of from 0 to 2; $R^6$ to $R^{10}$ each represent a group selected from the group consisting of $-NHCH_2CH=CH_2$, $-N(CH_2CH=CH_2)_2$, $-OCH_2CH=CH_2$, $-CH_2CH=CH_2$, $-CH_2CH_2OCH=CH_2$, $-(C_6H_4)-CH=CH_2$, $-O(C_6H_4)-CH=CH_2$, $-CH_2(C_6H_4)-CH=CH_2$, $-NH(C_6H_4)-CH=CH_2$, $-N(CH_2CH=CH_2)-(C_6H_4)-CH=CH_2$, $-O-R-OOC-C(R')=CH_2$, $-NH-R-NHCO-C(R')=CH_2$, and an aryl group having 12 or less carbon atoms, wherein R represents an alkylene group having from 2 to 5 carbon atoms and R' represents hydrogen or a methyl group; and at least one of $R^6$ to $R^{10}$ contains a $-CH=CH_2$ group or a $-C(CH_3)=CH_2$ group.

6. The arc extinguishing resin processed article as claimed in claim 2, wherein the polyolefin resin (A) is an ethylene-vinyl alcohol copolymer.

7. The arc extinguishing resin processed article as claimed in claim 6, wherein the microcapsules (B) contain water in a core material in an amount of from 5 to 100% by mass, and are contained in the resin composition in an amount of from 0.5 to 90% by mass.

8. The arc extinguishing resin processed article as claimed in claim 6, wherein the reactive organophosphorus flame retardant (C) is an organophosphorus compound represented by the following formulae (I) or (II), and is contained in the resin composition in an amount of from 0.5 to 20% by mass:

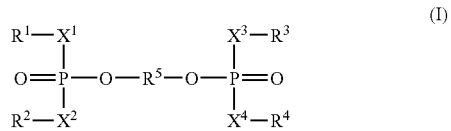

(I)

wherein $R^1$ to $R^4$ each represent $CH_2=CY^1-Y^2-$ or a monofunctional aromatic hydrocarbon group which may contain a hetero atom; $R^5$ represents a bifunctional aromatic hydrocarbon group which may contain a hetero atom; and $X^1$ to $X^4$ each represent a group selected from the group consisting of $-O-$, $-NH-$ and $-(CH_2=CY^1-Y^2)N-$, at least one of $X^1$ to $X^4$ contains $-NH-$ or $-(CH_2=CY^1-Y^2)N-$, and at least one of $R^1$ to $R^4$ and $X^1$ to $X^4$ contains $CH_2=CY^1-Y^2-$, wherein $Y^1$ represents hydrogen or a methyl group, and $Y^2$ represents an alkylene group having from 1 to 5 carbon atoms, or $-COO-Y^3-$ wherein $Y^3$ represents an alkylene group having from 1 to 5 carbon atoms;

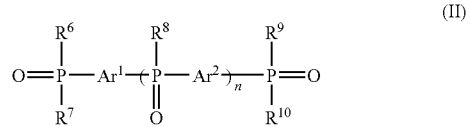

(II)

wherein at least one P—C bond is contained in one molecule; $Ar^1$ and $Ar^2$ each represent a bifunctional aromatic hydrocarbon group having 20 or less carbon atoms and not containing mobile hydrogen; n is an integer of from 0 to 2; $R^6$ to $R^{10}$ each represent a group selected from the group consisting of $-NHCH_2CH=CH_2$, $-N(CH_2CH=CH_2)_2$, $-OCH_2CH=CH_2$, $-CH_2CH=CH_2$, $-CH_2CH_2OCH=CH_2$, $-(C_6H_4)-CH=CH_2$, $-O(C_6H_4)-CH=CH_2$, $-CH_2(C_6H_4)-CH=CH_2$, $-NH(C_6H_4)-CH=CH_2$, $-N(CH_2CH=CH_2)-(C_6H_4)-CH=CH_2$, $-O-R-OOC-C(R')=CH_2$, $-NH-R-NHCO-C(R')=CH_2$, and an aryl group having 12 or less carbon atoms, wherein R represents an alkylene group having from 2 to 5 carbon atoms and R' represents hydrogen or a methyl group; and at least one of $R^6$ to $R^{10}$ contains a —CH=$CH_2$ group or a —C($CH_3$)=$CH_2$ group.

9. A circuit breaker comprising:

a fixed contact having a fixed contact point, a movable contact which has a movable contact point contacting the fixed contact and performs a switching action to the fixed contact, and an arc extinguishing apparatus which extinguishes an arc generated when the fixed contact and the movable contact perform the switching action, wherein the arc extinguishing apparatus comprises an arc extinguishing resin processed article comprising a resin composition comprising (A) a polyolefin resin that has hydroxyl group substituted for a portion of hydrogen atoms in the methylene chain and that contains 0.2 to 0.7 mole hydroxyl group per mole methylene group, (B) microcapsules containing water as a core material, and (C) a reactive organophosphorus flame retardant having a terminal unsaturated bond, the resin composition being molded and then subjected to radiation crosslinking.

* * * * *